United States Patent
Milliere

(10) Patent No.: US 8,940,215 B2
(45) Date of Patent: Jan. 27, 2015

(54) METHOD FOR ASSEMBLING WINDOW COAMING ON A FUSELAGE, COAMING TO BE USED, AND AIRCRAFT FUSELAGE PROVIDED WITH SUCH COAMING

(75) Inventor: Jerome Milliere, Leguevin (FR)

(73) Assignee: Airbus Operations SAS, Toulouse (FR)

( * ) Notice: Subject to any disclaimer, the term of this patent is extended or adjusted under 35 U.S.C. 154(b) by 119 days.

(21) Appl. No.: 13/695,392

(22) PCT Filed: Apr. 22, 2011

(86) PCT No.: PCT/FR2011/050939
§ 371 (c)(1),
(2), (4) Date: Oct. 30, 2012

(87) PCT Pub. No.: WO2011/135245
PCT Pub. Date: Nov. 3, 2011

(65) Prior Publication Data
US 2013/0043348 A1    Feb. 21, 2013

(30) Foreign Application Priority Data

Apr. 30, 2010 (FR) .................................. 10 53362
Oct. 28, 2010 (FR) .................................. 10 58884

(51) Int. Cl.
*B64C 1/14* (2006.01)
(52) U.S. Cl.
CPC .................................. *B64C 1/1492* (2013.01)
USPC ..................... 264/271.1; 403/345; 52/745.16; 264/275; 264/274; 156/91; 428/66.6; 428/107; 244/129.3
(58) Field of Classification Search
CPC .......... B64C 1/14; B64C 1/1492; B32B 37/12
USPC ....... 156/91; 244/129.3; 403/345; 52/745.16; 428/66.6, 107; 264/271.1, 274, 275
See application file for complete search history.

(56) References Cited

U.S. PATENT DOCUMENTS

| | | | |
|---|---|---|---|
| 2005/0042410 A1 | 2/2005 | Sakonjo et al. | |
| 2008/0217479 A1 | 9/2008 | Wood | |
| 2009/0084900 A1 | 4/2009 | Krahn | |
| 2011/0016823 A1 | 1/2011 | Wood | |
| 2011/0277924 A1* | 11/2011 | Bense | 156/245 |

FOREIGN PATENT DOCUMENTS

| | | |
|---|---|---|
| DE | 102005058749 | 2/2007 |
| WO | 8301237 | 4/1983 |
| WO | 2008109217 | 9/2008 |

OTHER PUBLICATIONS

ISR, Jun. 30, 2011.

* cited by examiner

*Primary Examiner* — Jeff Aftergut
*Assistant Examiner* — Jaeyun Lee
(74) *Attorney, Agent, or Firm* — Greer, Burns & Crain Ltd.

(57) ABSTRACT

A reduction of the multiple costs of manufacture, assembly use, and upkeep connected with the assembly of window frames on aircraft fuselages. To this end, the invention provides a particular shape for the frames connected to the fuselage skin according to a specific assembly method. The shape enables, among other things, the window frames to be fitted onto the skin by means of adhesion and also frames to be dispensed with between the fuselage and the window. In one embodiment, composite material window frame has a wall totally in the shape of a crown that is connected, through co-adhesion, to the inner surface of the fuselage skin, also made of composite material. The skin is cut into a window-receiving opening, and the frame has a T-shaped cross section, wherein the bar of the "T" that forms the crown includes two portions having substantially equal lengths "T."

7 Claims, 5 Drawing Sheets

METHOD FOR ASSEMBLING WINDOW COAMING ON A FUSELAGE, COAMING TO BE USED, AND AIRCRAFT FUSELAGE PROVIDED WITH SUCH COAMING

BACKGROUND OF THE INVENTION

The invention relates to a method for mounting window frames on an aircraft fuselage as a support, a frame to implement such method, as well as an aircraft fuselage equipped with such window frames.

The aircrafts are made of a pseudo-cylindrical-shaped fuselage being reinforced by stiffeners, such as frames and ribbands, so as to resist mechanical constraints met during the different flight phases, in particular the ones exerted by pressure.

Openings generally of a rectangular shape being rounded at the angles or oblong, are arranged in the fuselage to mount windows of the same shape, the transparency of these windows allowing the passengers to have a view on the external surroundings. Such windows are integral, in extension of their side wall, with frames of peripheral sizes higher than the ones of the openings arranged in the fuselage walls to accommodate the windows. Such configuration then allows the frames to be abutted on the fuselage taking profit from the internal pressure—being substantially higher than the pressure outside the aircraft during the flight, the internal atmosphere being pressurized—to perform a "natural" sealing of the windows on the fuselage.

Holding means fastened to the frames and mechanical connection means between the frames and the skin of the fuselage, through screwing or riveting, aim at creating a mechanical integrity between the frame and the skin of the fuselage such that the frame participates in the mechanical holding of the assembly. Such configuration allows in addition an air and water seal to be provided in such area.

These frames must also be able to resist the mechanical constraints exerted by the bending of the fuselage and the pressurization applied to the windows. Moreover, the respect of the aerodynamic profile of the external skin of the fuselage is to be considered in the integration of the windows into the fuselage.

SUMMARY OF THE INVENTION

The invention aims at reducing the multiple costs of manufacture, assembly, use and maintenance related to this type of mounting by reducing particularly the mounting time by a simplification of the window mounting, while improving the quality of the installation, in particular by an adapted configuration of the frame and a weight reduction of the installation.

To do so, the invention provides a particular connection between the frame and the fuselage skin according to a specific assembling method allowing amongst others a frame part to be dispensed with between the opening edge, the fuselage and the window.

More precisely, the invention has as an object a method for assembling frames on a fuselage of an aircraft, wherein fuselage elements comprising a fuselage skin, presenting an internal side and an external side, and frame parts are assembled (in a same site) in a supply phase. The skin and the frames are made of composite materials based on carbon fibers. Such material is respectively called baked or crude depending on whether the cross-linking of the matrix resin of the composite has been effected or not, the cross-linking being triggered by a pressure/temperature cycle specific to the material being used.

Each frame presenting a globally crown-shaped wall, a glue film is injected in a preparation phase on the interface between a substantially plan external side of the frame crown and the internal side of the skin according to predefined places (within such skin). The so-assembled unit is introduced into an enclosure, in general an autoclave, to perform a co-gluing phase combining the gluing of the frames and the skin baking in determined conditions of time, temperature and pressure being known for example by the co-baking of the ribbands pre-baked on a crude skin in a composite material.

Further to the co-gluing, a machining phase comprises the formation of window openings by cutting an annular part of the crown made by the frame and the fuselage skin connected to this part, according to a profile being complementary of this of the windows to be mounted, and then by a withdrawal of the cut material. The frame parts being glued to the skin upon the above described step are then in addition mechanically fastened to the opposite fuselage skin with a limited number of fastening elements for covering ungluing cases. Thus, the windows placed into the openings are abutted on the fuselage skin. A window holding part can then be fastened onto the frame.

Such method advantageously integrates the co-gluing of the ribbands on the fuselage skin in the same conditions of time, temperature and pressure. Moreover, such method can be adapted to any type of window and fuselage.

The invention also aims at allowing the frame to be maintained so that, at the end of the preparation phase, the frame can stay on the support in a position defined by a predefined tolerance interval.

To perform the installation of the frames, appropriate openings are first arranged in the fuselage and each frame is positioned approximately, in a positioning phase, into the opening being dedicated to it through reference areas—for example fore-holes—located on the fuselage skin and on the frame. Each window is then placed in the bearing formed by the frame.

The frame is then fastened to the fuselage skin by riveting or screwing means, generally on two concentric rows. A high number of fastening elements-bolts or rivets—is then required, for example 72 or 96 bolts.

Generally, speaking, whatever the assembling type—by gluing, heating, radiating, etc.—there is a positioning phase for the frame on the support before any final assembling of the frame on such support. Now, such a positioning is carried out with the help of temporary means (markings, nails, wedges, struts, etc.)—and sometimes in difficult conditions (congestion, temperature, etc.)—which do not allow either a precise or a constant position holding of the frame during this phase.

In particular, for the window frames of an aircraft in the case of a configuration where the frames would be fastened to the skin by gluing thanks to the use of a glue film interposed between the frame and the skin during the baking/gluing cycle, the pre-baked frames will "float" on the glue film and their position, at the end of the baking cycle, is then imprecise and can go beyond pre-defined tolerances.

To reach this frame holding objective, the invention provides a positioning of the frame with a particular abutment.

More precisely, the invention also has as an object to provide a method for assembling a frame onto the fuselage skin of an aircraft as a given support, through the application of the above defined method, wherein the frame presents a wall side for the assembling and an internal contour formed by such wall defining an orifice. The method comprises in the preparation phase a frame positioning phase on the support followed by a fastening phase of the frame on said support. In the positioning phase, the frame is located in a mold and a centering unit is inserted, in abutment against its internal contour, into the frame orifice closed by the mold. An adhesive film is inserted between the frame and the support provided for the assembling. The support is contacted with the assembling side of the frame according to a place referenced by the mold and the centering unit is then connected with the support. In the fastening phase, during which the mold is withdrawn and the frame made integral with the support by the adhesive curing, the position of the frame relative to the support stays stationary by an auto-centering of the frame on the centering unit connected to the support.

The position holding of the frame on the support during the fastening phase allows then the position tolerance interval to be minimized.

Preferably, the frame/support assembling can be subjected in the fastening phase, according to the nature of the adhesive, to an energy addition converting the adhesive film into an integral link.

According to a particular embodiment, the frame is pre-baked and the fastening phase then consists in a co-gluing of the frame and the support, combining the gluing of the frame and the baking of the support in temperature and pressure conditions defined as a function of the materials forming the frame, the adhesive and the support. Advantageously, the co-gluing is performed in an oven enclosure, in general an autoclave.

A final phase for cutting the support can be advantageously implemented to form an opening in the support so that such opening is surrounded by the frame. This opening can present a contour completing the internal contour of the frame. The cutting can simultaneously recess the support and enlarge the orifice of the frame so as to form only one contour.

The method applies more particularly to the frame of fuselage openings in an aircraft—such as auxiliary outlets (cabling, material, safety, etc.) traps and specifically traps of the landing gear, access panels—and in particular to window frame.

For all those openings, the frame is in a composite material, the support is formed by the fuselage skin of the aircraft, also in a composite material, and a co-gluing cycle during the fastening phase combines the gluing of the frames, being previously pre-baked, with the help of an adhesive film and the baking of the skin in determined conditions of time, temperature and pressure, known for example from the co-baking of reinforcing ribbands being pre-baked on a crude skin in a composite material.

In this application, each template allowing the abutment of the internal contour of the frame may fill the wall frame orifice. The connection between the template and the fuselage skin is preferably performed by harpooning A final clipping phase for the support is implemented to form a desired opening into the skin as a function of the profile of an accessory element to be mounted, a window or any other accessory element (trap, door, plug, etc.), into such opening reinforced by the frame. The clipping recesses the fuselage skin as well as, preferably, the facing frame according to a contour preferably wider than the initial internal contour of the frame so as to define an opening adapted for the accessory to be mounted. Moreover, the clipping phase allow the area where the harpoons are arranged to be withdrawn, such area being able to present quality defects caused by the harpoons.

The invention also relates to a frame that, seen in section, presents a "T" shape being particularly adapted to the implementation of the gluing phase in said mounting method, with a "T" bar forming by development the crown and a root of "T" advantageously forming a median projection of the frame inside the fuselage so as to fasten a holding part.

In particular, after cutting the window openings, the "T" bar presents two portions—on either side of the "T" root—with substantially equal lengths, thereby providing a good seating balance of the frame parts on the fuselage skin on either part of the "T" root.

The invention also relates to an aircraft fuselage comprising a fuselage skin, presenting an internal side and an external side, windows frames and ribbands in composite materials. The frames present a globally crown-shaped wall having a substantially plan external side glued onto the internal side of the skin. And the skin of the fuselage is cut according to a profile matching this of the window in the opposite position, the windows then abutting directly on the skin through a structural joint. Moreover, the frames are mechanically connected to the internal skin of the fuselage ($30i$). They present in section a "T" shape with a "T" bar forming in a development the external crown side and a "T" root forming an median projection of the frame towards the inside of the fuselage.

BRIEF DESCRIPTION OF THE DRAWINGS

Other aspects, characteristics and advantages of the present invention will appear at reading the following detailed description in reference to the accompanying drawings in which, respectively.

DETAILED DESCRIPTION OF THE PREFERRED EMBODIMENTS

In the whole present text, the term "lateral," "laterally" or equivalent relates to the contour walls of the mentioned elements—window, joint, frame—. The terms of the "internal" and "external" or equivalent type relates to element sides turned towards the internal side "IN" and, respectively towards the external side "EX." The fuselage of an aircraft defines an internal space INT and an external space "EXT," outside the fuselage. The present text defines internal and external elements according to their position, respectively, in the spaces INT and EXT.

Figure 1:
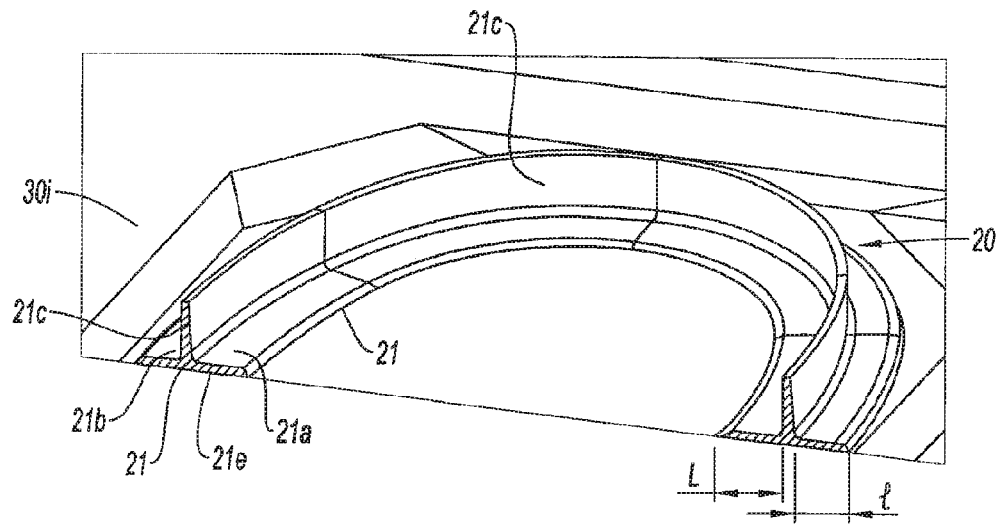
FIG. 1 is a partial view in section and in perspective of a frame example on the fuselage skin after the co-gluing phase and before the clipping phase.

There is shown on FIG. 1 a frame 20 according to the invention made in a composite material based on carbon fibers with a resin matrix. Such frame 20 presents in section a "T" shape (reversed "T" in the reading direction of the FIG.) comprising "T" bar 21 forming a crown in the tri-dimensional development of the part—an external side 21a of this crown—and a "T" root 21c forming a median projection of the frame 20 inside the fuselage, in a mounting position. The crown 21 has two portions on either side of the "T" root 21c, a central portion 21a, i.e. turned towards the center of the crown and another so-called peripheral portion 21b. The central portion 21a presents a length "L" higher than this "l" of the peripheral portion. In one example, the ratio "l/L" is 75%.

In the present text, the term "central" relates to an element turned towards a crown or window center in opposition to the term "peripheral."

Figure 2:
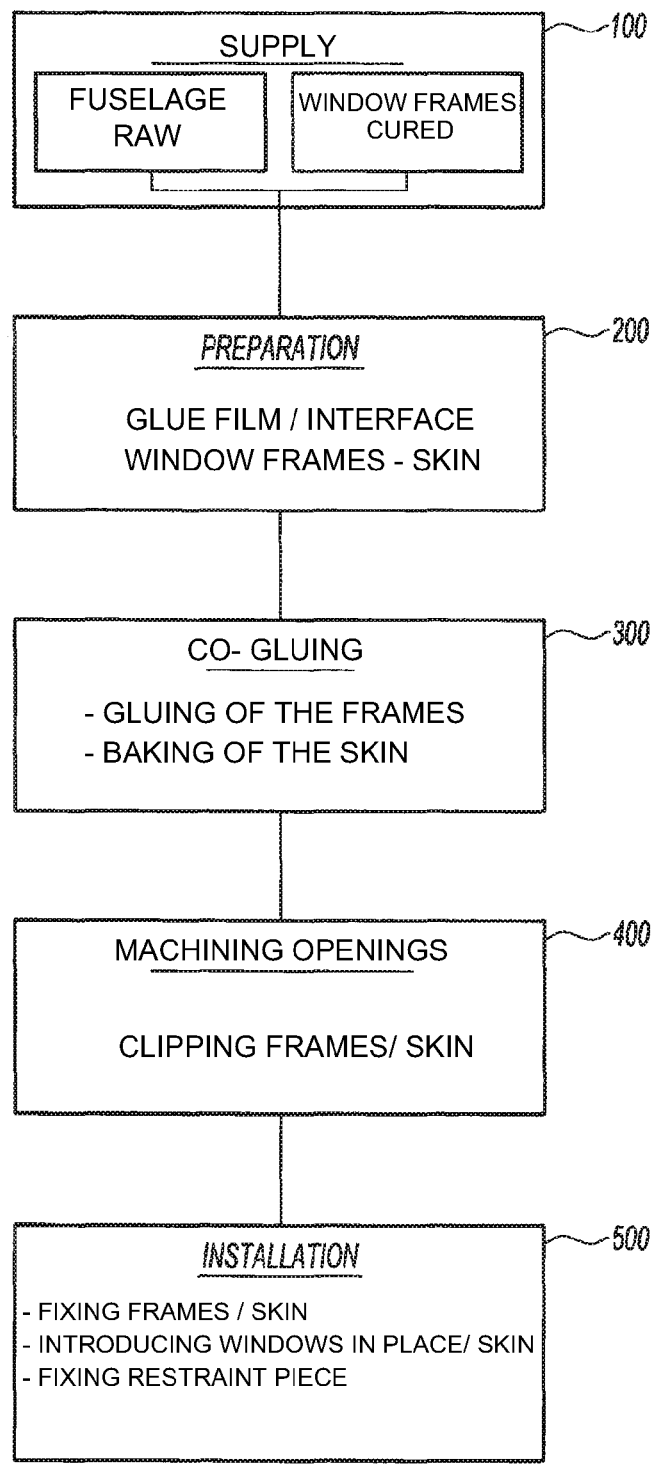
FIG. 2 is a block diagram of steps illustrating the main phases of the mounting method according to the invention.

In reference now to the block diagram of FIG. 2, a first supply step 100—according to the mounting method of the invention—consists in grouping in a same site fuselage skins in a composite material based on still crude carbon fibers with a resin matrix; i.e. the cross-linking of which has not been caused and window frames 20 being "baked," i.e., having still completed their cross-linking in pressure and temperature conditions convenient for the composite material, etc.

In a following preparation phase 200, a glue film, for example an epoxy glue, is injected into an interface formed between the substantially plan external side of each crown 21 of the frames 20 and the fuselage skin according to previously marked places.

The so-assembled unit is introduced into an autoclave to carry out a co-gluing phase 300 combining the baking of the skin and the gluing of the frames on said skin in only one phase.

Advantageously, to save preparation time, the gluing of the fuselage reinforcing ribbands—also in a baked composite material—is effected simultaneously with this of the frame parts during the co-gluing phase.

The time, temperature and pressure conditions of the autoclave are these usually implemented to carry out the gluing of the fuselage skins and the reinforcing ribbands. For example, a temperature rise between 0.5 and 2.5° C. per minute is provided to reach 180° C.—with an intermediate level during about 120 minutes—at the pressure of about 6 to 10 bars. Another temperature level of 120 minutes is respected before a decrease in temperature. The decrease is controlled up to the temperature of about 50 to 70° C. according to a slope between 1 and 3° C. per minute, before the final return to the ambient temperature and pressure.

Further to this gluing phase, the frames are directly positioned in their final place on the skin, with no need of an additional keying and positioning operation. The mounting costs and times are reduced as much.

After the co-gluing phase with the autoclave, a machining phase 400 comprises the arrangement of window openings by cutting the central portion 21a of the frame 20 and the fuselage skin being opposite. Cutting is made so that the profile of the openings corresponds to the complementary profile of the windows to be installed. The so-cut material is withdrawn so that the corresponding openings appear.

Figure 3:
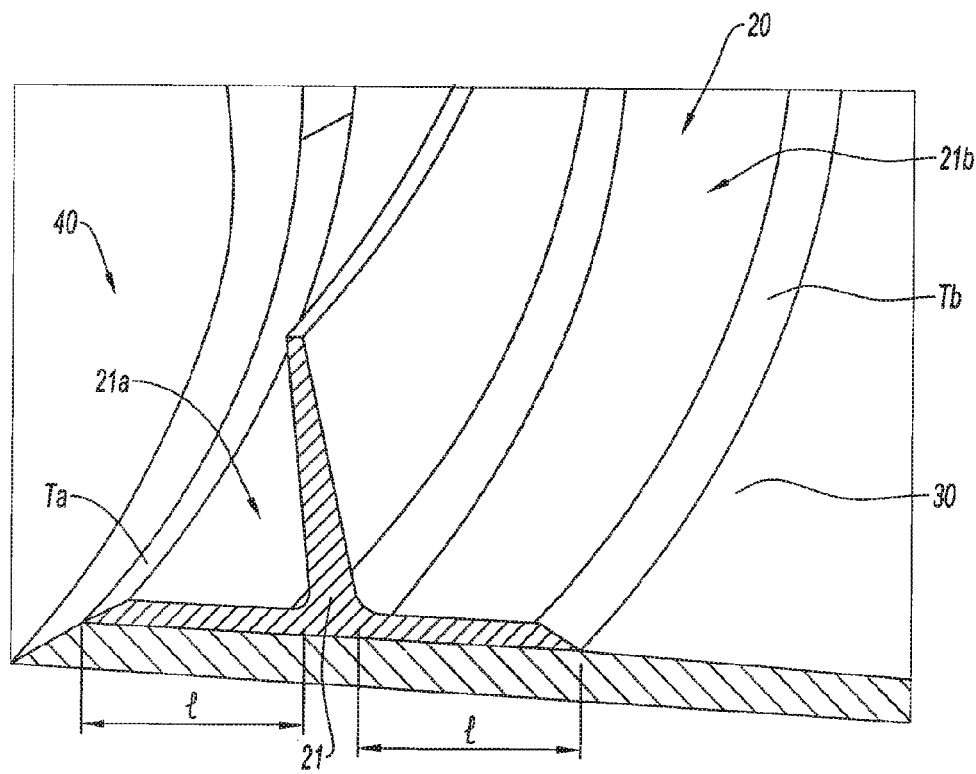
FIG. 3 is a partial view in section and in perspective of a frame example on the fuselage skin after the clipping phase.

Such machining phase allows portions 21a and 21b of the frame 20 to be made with a substantially equal length. FIG. 3 shows this operation that releases the openings 40 and equalizes the length of the portions 21a and 21b of the frame crown 21, such lengths being previously calculated so that, precisely, the clipping aligns the length "L" of the portion 21a on this "l" of the portion 21b. Such equalisation provides a good seating balance of the frame parts on the fuselage skin, on either part of the root 21c of the frame. The end Tb of the peripheral portion 21b of the "T" bar 21 has already been bevelled by machining at the stadium of the frame manufacture (see FIG. 1) so as to realize substantially a profile continuity with the surrounding fuselage skin 30.

The end profiles 30b of the skin 30 and the end Ta of the portion 21a of the frame 20 are bevelled by clipping. Such a cutting is made according to a same angle—for example with the help of a machining tool 3D, 5 axes—so that the openings 40 can match the complementary bevelled profiles of the windows.

A final installation phase 500 then comprises the mechanical fastening of the frames 20 to the opposite fuselage skin.

Figure 4:
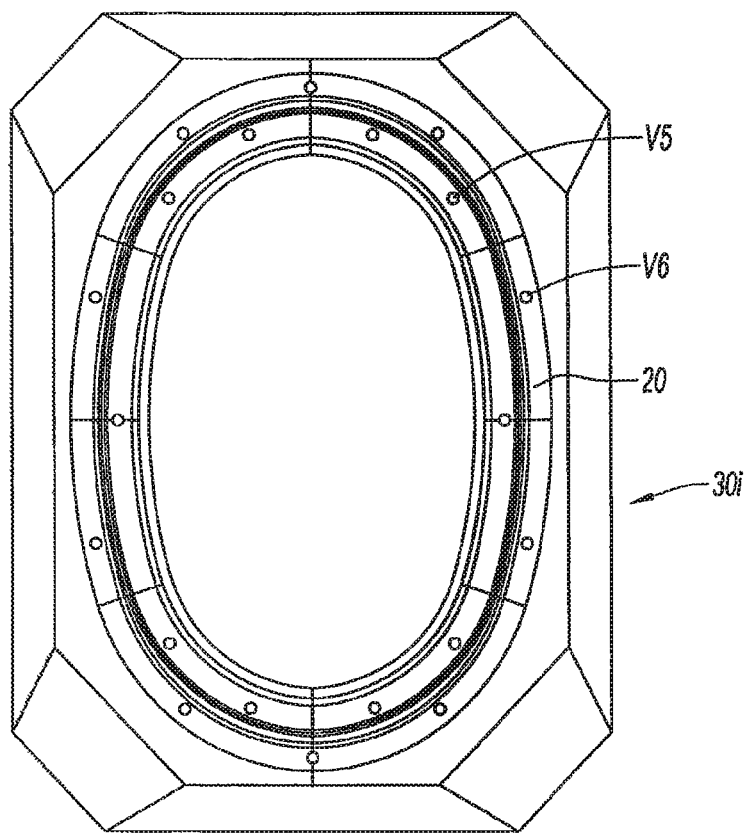
FIG. 4 is an upper view of a frame fastened in a staggered arrangement on a fuselage skin.

Each of the portions 21a and 21b of the bar 21 of the frame 20 is mechanically connected to the opposite internal skin 30i so as to form two rows of connecting means surrounding the windows, bolts V5 and V6 in the illustrated example, preferably according to a staggered arrangement as represented. Screwing is performed by titanium bolts. The number of bolts is substantially reduced with respect to the state of the art—because of the complete abutment of the frame on the fuselage with no cantilever and the efficient gluing by the co-gluing, and that a staggered arrangement allows a balanced distribution around the windows. For example, 20 bolts are used in the upper side of FIG. 4 illustrating the frame 20 fastened to the internal skin 30i of the fuselage before the positioning of the window. The use of a reduced number of bolts thanks to the invention, for example between 16 and 24, with no prejudice to the quality of the integral connection, allows to reduce the mounting time and cost and to reduce in weight the fuselage, thereby inducing gains in terms of operation and maintenance costs.

Figure 5:
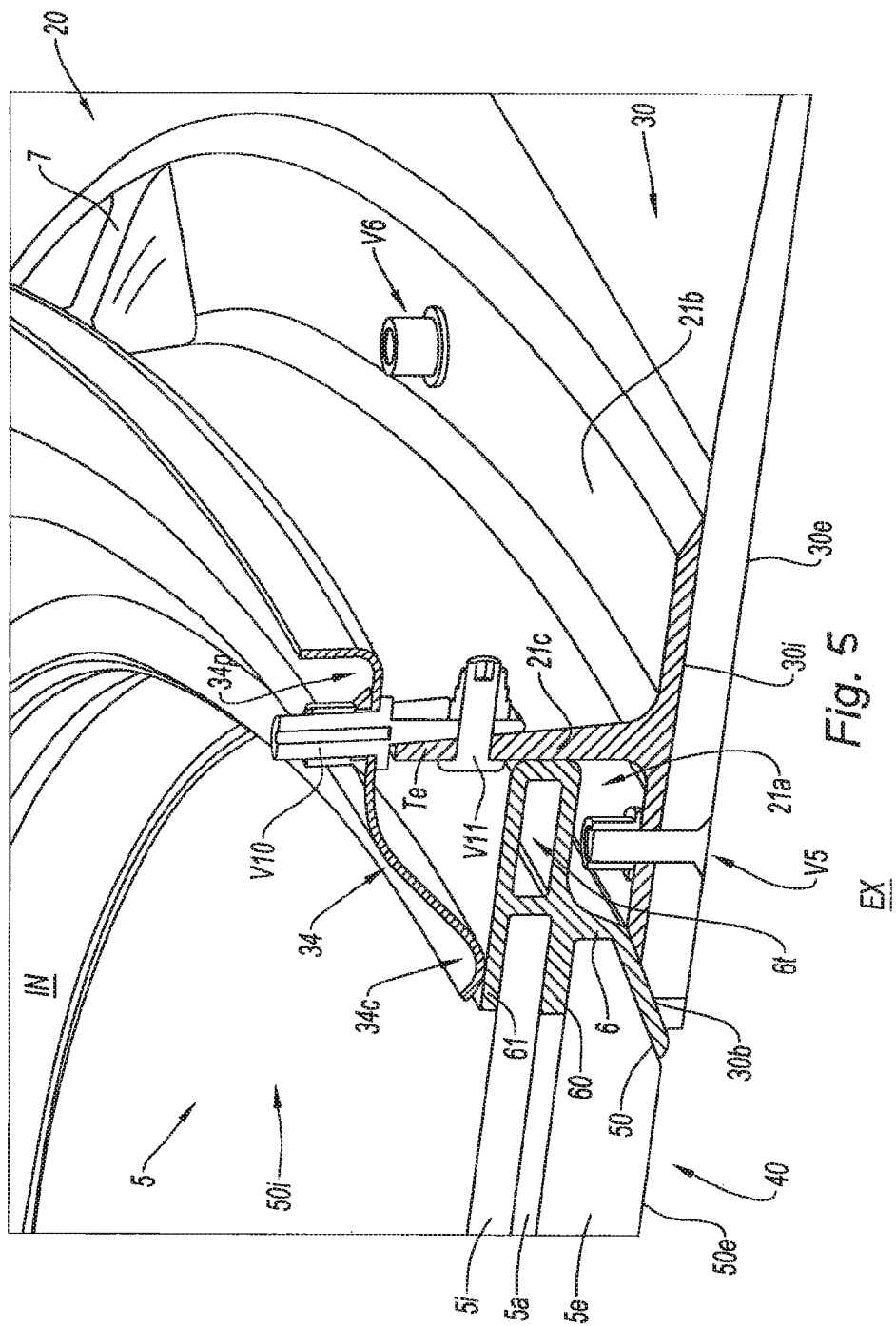
FIG. 5 is a view in section and in perspective of an exemplary fuselage according to the invention equipped with a window mounted in connection with a frame.

The windows 5 are then positioned by a direct abutment on the fuselage skin. The sectional and perspective view of FIG. 5 shows more precisely an example of fuselage according to the invention, equipped with a window 5 mounted in connection with the frame 20.

In such example, the lateral side 50 of the window 5 as well the ends 30b of the fuselage skin and the Ta of the frame have complementary bevelled profiles. Other profiles to reduce the window sizes towards the outside "EX" and complementary profiles of the fuselage skin are possible: concave, at right angles according to one or more steps, a combination of those profiles and/or bevelled profiles. Each window 5 is made of two plates in an high resistant acrylic plastic—or in a special glass: a first internal plate 5i with a substantially right profile (perpendicular to the main sides) and a second thicker external plate 5e with a bevelled profile forming the side 50, the two plates 5i and 5e being separated by an air layer 5a.

As previously described in reference to the state of the art, the window plates and layer 5i-5e-5a have been assembled together by a structure joint 6. More precisely, the joint 6 is inserted within the air layer 5a onto a crown 60—enabling to calibrate the thickness clearance 5a between the two plates—, onto a crown 61 on the edge of the main internal side 50i of the internal plate 5i, as well as on their bevelled side 50. The end profiles of the skin 30 and the portion 21a of the frame 20 match the profile of the joint 6 and the side 50 of the window 5 after clipping according to a same angle, as previously described. The external side 32e of the skin 30 is substantially aligned in flight on the external side 50e of the window 5. To do so, the side 50e is slightly retracted (as shown) upon mounting so as to anticipate the distortion caused in flight by the cabin pressurization. The so-calculated alignment allows in flight the parasite drag to be minimized, which could be formed by a remaining offset.

Thus, no part of the frame is in interposition between the fuselage and the window: no interstice opening onto the outside is formed between the frame and the fuselage skin, and the lightning channeling copper layers on the frames of the prior art then become useless. A mass gain and a recurrent cost gain of the frame are realized.

A window holding part 34 is finally fastened in a median projection of the frame towards the inside of the fuselage. Such holding part 34, globally crown-shaped like the internal crown 61 of the window joint 6, is used advantageously to finalize the mounting of the window 5 on the frame 20. Such holding part 34 abuts, in its central edge 34c, on the crown 61 of the joint 6 and is fastened, in the peripheral edge 34p, on the end Te of the root 21c of the frame 20 forming the median projection. Such fastening is carried out by a double attachment: a first integration screw V10 and a transversal fastening screw V11 for such attachment V10 on the root 21c. The peripheral edge 34p rises towards the inside beyond the root 21c of the frame 20. The holding part 34 is for example a sheet or a thermoplastic material being folded according to the desired conformation.

Advantageously, the joint 6 of the window 5 laterally extends in extension of the internal plate 5i under the shape of a hollow tore 6t with a substantially rectangular section, between the window 5 and the root 21c of the frame 20. Such extension can be used as a condensation channel for the infiltration water and as an auto-centering of the window in the frame. Alternatively, such a joint extension can be added and glued to the root 21c of the frame 20.

In an alternative embodiment, illustrated on FIG. 5, it will be noticed that the crown 21 is provided with lateral reinforcing ribs 7 regularly distributed along the frame 20, between the root 21c and the peripheral portion 21b. These ribs allow the risk of unfolding the frame generated by the mechanical constraints to be limited.

In another alternative embodiment, it is also possible to provide the integral manufacture of several frames under the shape of a substantially flat band adapted to be co-glued to the fuselage skin. The frames of such bands are pre-formed by making a projection 21c of the "T" root type through molding or pre-weaving techniques respectively of the RTM ("Resin Transfer Molding") type or LRI ("Liquid Resin Infusion") type. In order to reduce the weight of such bands, it is possible to provide the elimination of some areas between the frames while maintaining the stiffness of the assembly.

Figure 6:
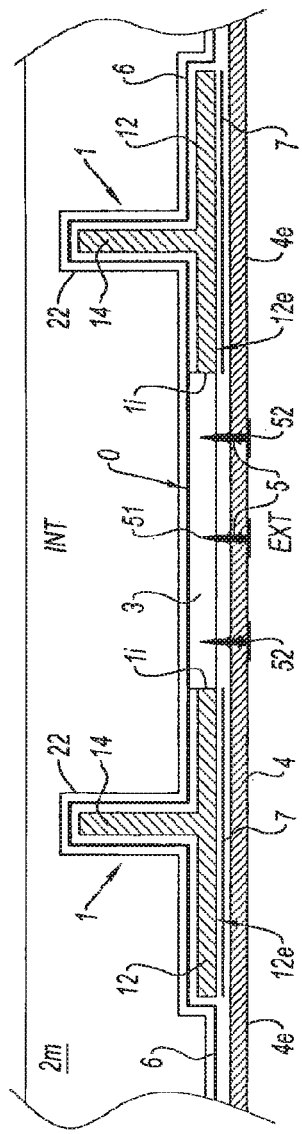
FIG. 6 is a partial schematic sectional view of an exemplary assembly of a window frame on a fuselage skin of an aircraft in the positioning phase of the method according to the invention.

Referring to FIG. 6 illustrating the positioning phase, each frame 1 is made of a crown 12 and an annular projection 14 intended to extend in the internal space INT of the fuselage in an aircraft.

The frames have thus a "T" profile as illustrated in section on the FIG., thereby also showing the existence of an orifice "O" bordered by the frame 1 and appearing between the "T" profiles on the sectional view of FIG. 6. The frames are made in a composite material based on carbon fibers and are pre-baked in a prior preparation phase.

Polymethacrylimide foam templates 3 are arranged in the orifices "O" of the frames 1, on abutment against the internal contour 1i of the crowns 12 defining the orifice limit. Alternatively, the templates can be made in a polymer foam of polyurethane, polyester and NBR.

These templates form rigid centering elements being continuous and complementary to the internal contours of the frames.

The frames 1 and the template 3 are then arranged in a male mold 2M comprising annular grooves 22 being shaped to accommodate the annular projections 14 of the frames 1. A bagging is previously carried out by putting a thin envelope of a thermoplastic elastomer or a polyimide 6 on the whole frames 1 and templates 3 so as to make easier the subsequent retraction of the male mold 2m and allow the application of the pressure cycle on the frame/template/fuselage skin assembling during the subsequent baking cycle.

In this positioning phase, a film of an epoxy resin 7 is applied on the side 12e of the crown 12 located on the side opposite to the projections 14, i.e., in other words, on the external side EXT. The resin participates in the integration of the frames on the fuselage skin during the co-baking cycle of the subsequent fastening phase.

A fiber distribution machine coats successive composite layers so as to make the fuselage skin 4 by drape forming in a geometrical reference with respect to the marking points located on the periphery of the male mold.

At the end of the draping of the skin 4, harpoons 5 are implanted from the external side 4e of the skin 4, crossing the skin 4 and entering the template 3. A template/skin connection is thus made by catching the template onto the support point by point. The position of the harpoons 5 is advantageously adjusted by a laser assistance projecting the laser rays onto the desired places on the side 4e. Besides the harpooning technique, the template/skin catching can be made by stapling, nailing, hooking or equivalent.

The harpoons 5 have a limited length and a conical end 51 so as not to damage the bagging envelope 6. Moreover, these harpoons 5 present a head 52 being thin enough in thickness not to disturb the co-baking during the subsequent fastening phase.

During the fastening phase, as illustrated by the partial sectional view of

Figure 7:
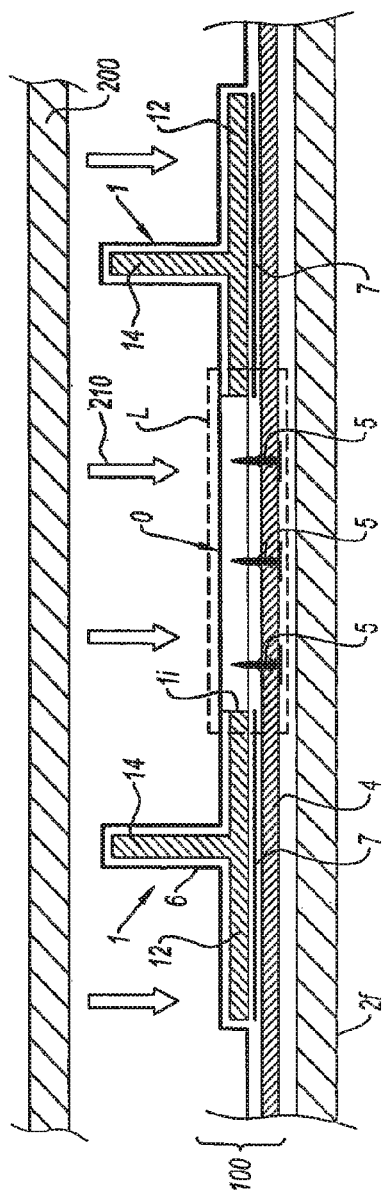
FIG. 7 is a same view of the preceding example in a fastening phase.

FIG. 7, the frame/template/skin assembly 100 is introduced into an autoclave enclosure 200 after a transfer of said assembly onto a female mold 2f. The enclosure 200 is adjusted in appropriate temperature and pressure (210) to perform the co-baking of the crude skin 4 on the pre-baked frames 1 as well the curing of the resin 7.

The position of the frames 1 relative to the skin 4 stays frozen by auto-centering of these frames on the templates 3 connected to the skin 4 by the harpoons 5. The position holding for the frame on the support during the fastening phase allows then the position tolerance interval to be minimized, for example such tolerance interval to be divided by 4.

In the final cutting phase, window openings are made by clipping of the frame 1/skin 4 assembling in the area limited by the line "L" in dotted line (FIG. 7). The frame/skin assembly is released from the enclosure and removed from the mold.

Figure 8:
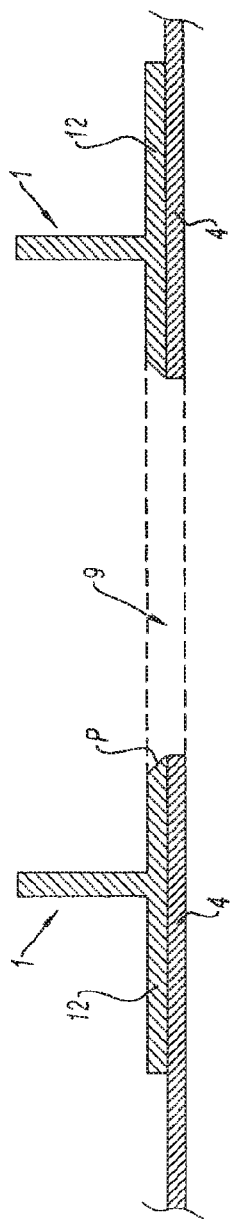
FIG. 8 is a same view of the preceding example after clipping of the desired opening

Referring to FIG. 8, the cutting of the skin 4 and the crown 12 of the frame 1 by a clipping tool puts in evidence an opening 9 adapted to receive a window. Advantageously, the clipping that recesses the fuselage skin also cuts, simultaneously, the frame 1 according to a contour wider than the initial internal contour 1i of the frame crown 12. The so-formed profile "P" in the frame and the skin enables to define the opening 9 adapted to the window to be mounted.

The invention is not limited to the exemplary embodiments described and represented. For example, the frames may have various profiles in the shape of "L" or "C."

Moreover, the fastening of the frame on the fuselage skin and of the holding part onto the frame can be carried out by any adapted means, advantageously by screwing, riveting, eccentric screwing, clipsing, embossing, etc.

Moreover, the invention applies to any support frame type, with or without any opening, whatever in the automobile field, the building, the furniture, the decoration, etc.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A method for assembling frames on a fuselage of an aircraft, wherein fuselage elements comprising a fuselage skin, presenting an internal side and an external side, frames and ribbands are assembled in a supply phase, the skin and the frames being made of composite materials based on carbon fibers, comprising the steps:
  with each frame presenting a globally crown-shaped wall, injecting a glue film, in a preparation phase, on an interface between a substantially plan external side of the frame crown and an internal side of the skin according to predefined places,
  introducing the so-assembled unit into an enclosure to perform a co-gluing phase combining gluing of the frames, and fuselage skin baking, in determined conditions of time, temperature and pressure,
  forming window openings in a machining phase by cutting an annular part of the crown made by the frame and the opposite fuselage skin connected to this part, according to a profile being complementary of this of the windows to be mounted,
  withdrawing the cut material, and
  mechanically fastening the frame parts to the opposite fuselage skin in an installation phase.

2. The assembling method according to claim 1, the frame presenting a wall side for the assembling and an internal contour formed by such wall defining an orifice, such method comprising in the preparation phase a frame positioning phase on the fuselage skin as a support, followed by a fastening phase of the frame on said support, such method comprising, in the positioning phase:
  locating the frame in a mold and inserting a centering unit, in abutment against its internal contour, into the frame orifice closed by the mold, and applying an adhesive film onto the frame side adapted for the assembling;
  contacting the support with the assembling side of the frame according to a place referenced by the mold and then connecting the centering unit with the support,
  and in the fastening phase, during which the frame is made integral with the support at least by the adhesive curing, maintaining stationary the position of the frame relative to the support by an auto-centering of the frame on the centering unit connected to the support.

3. The assembling method according to claim 2, wherein the frame/support assembling is subjected, in the fastening phase, to an energy addition converting the adhesive film into an integral link.

4. The assembling method according to claim 2, wherein the cenetring unit is formed by a template being rigid, continuous and complementary to the internal contour of the frame.

5. The assembling method according to claim 4, wherein the connection between the template and the support is made by catching the template onto the support point by point.

6. The assembling method according to claim 5, wherein the co-gluing of ribbands on the fuselage skin is made simultaneously with the co-gluing of the frames, in the same conditions of time, temperature and pressure.

7. The assembling method according to claim 6, wherein the cutting of the frames and the opposite fuselage skin is carried out by clipping.

* * * * *